J. L. SCHRODER.
Ball Trap.
No. 201,952. Patented April 2, 1878.
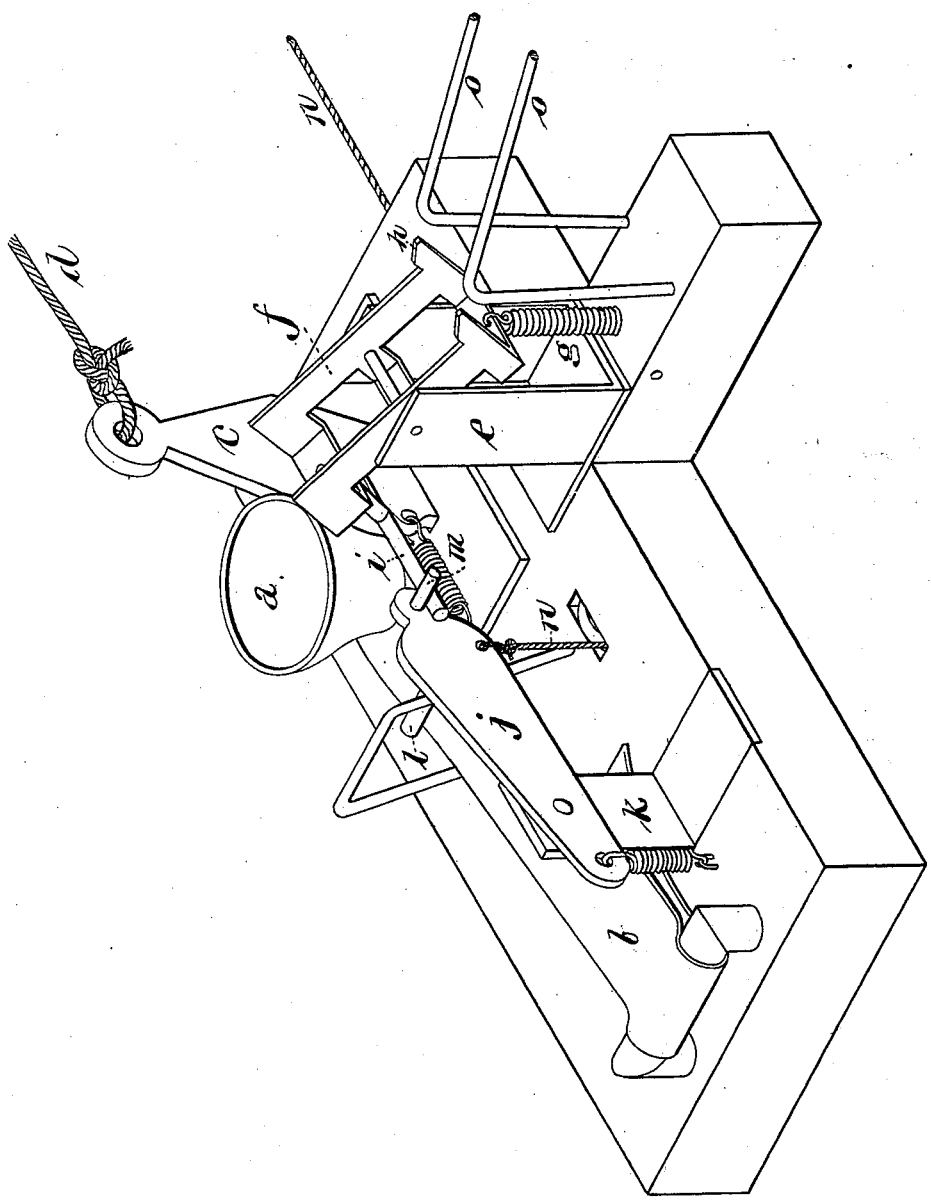

UNITED STATES PATENT OFFICE.

J. LEE SCHRODER, OF HAMILTON, OHIO, ASSIGNOR OF ONE-HALF HIS RIGHT TO JERVIS HARGITT.

IMPROVEMENT IN BALL-TRAPS.

Specification forming part of Letters Patent No. 201,952, dated April 2, 1878; application filed August 31, 1877.

*To all whom it may concern:*

Be it known that I, J. LEE SCHRODER, of Hamilton, in the county of Butler and State of Ohio, have invented a new and useful Improvement in Ball-Traps, which invention is fully set forth in the following specification and accompanying drawing, which is a perspective view of a ball-trap with my improvement attached.

Shooting at birds released from a trap is called "trap-shooting." A modern substitute for the birds in trap-shooting is a glass ball projected into the air by a modern catapult. The releasing and projecting machines are now known by the misnomer "trap." These traps consist essentially of a cup to hold the ball, a spring to propel the ball, and a trigger to restrain and release the spring.

In operating the trap the spring is deflected and restrained by the trigger, a ball placed in the cup, and at the proper time the trigger pulled and the ball projected.

It is obvious that the trap must be approached each time it is set, in order to place a ball in the cup and to set the spring.

The object of my improvement is to render ball-traps self-charging and capable of being set and entirely operated from a distance.

I construct the trap proper substantially as usual.

Referring to the drawing, $a$ is the ball-cup; $b$, the spring, which, on being depressed, hooks under a projection on the trigger $c$. The trigger-cord $d$, being pulled, releases the spring.

My improvement consists, substantially, of a reservoir to hold the supply of balls, in combination with devices for deflecting the spring and transferring a ball from the reservoir to the cup.

Referring again to the drawing, $o$ $o$ are rods projecting from one side of the trap, their nearer ends being supported by the trap. These rods lie at such distance from each other as to support the balls when placed upon them. The rods are sloped horizontally, so that the balls will tend to roll toward the trap, and are long enough to hold the desired number of balls, and their outer ends may be connected or supported or both. These rods form the reservoir. Any inclined trough would, of course, answer the purpose of the rods. Between the cup and the reservoir is placed the pivoted cut-off $f$, which is intermittingly a continuation of the reservoir, and constitutes a draw between the reservoir and the ball-cup.

Normally the cup end of the cut-off is elevated, and in this position practically closes the trap end of the reservoir and obstructs the passage of the balls toward the cup. In this position the cut-off furnishes sufficient addition to the reservoir to receive one ball. The cut-off is held in its normal position by the spring $g$, and it should be understood that in this position it always contains one ball pressed upon by the supply of balls in the reservoir.

The cut-off is placed in such a vertical position that, when oscillated out of its normal position, the ball which it contains will roll down the cut-off into the cup, and at the same time the reservoir end of the cut-off will debar the progress of the balls in the reservoir. From this description of the functions and operations of the cut-off $f$, it should be understood that each time it takes its normal position it receives a ball from the reservoir, and each time it is oscillated the contained ball will roll into the cup.

From the base of the trap projects the upright $k$, which supports the fulcrum of the deflector $j$. The office of the deflector is to set the trap-spring and oscillate the cut-off. A cord, $n$, attached to the deflector, is led off, in company with the trigger-cord $d$, to a suitable distance. As shown in the drawing, the cord passes around a pulley in the base of the trap; but it is obvious that a crank-arm upon the deflector would allow the pulley to be suppressed. An arm, $i$, attached to the cut-off, projects toward the deflector and under a projection, $m$, upon the deflector. A pin, $l$, projects from the deflector directly over the trap-spring. The operation of the devices can now be readily comprehended. The cord $n$, being pulled, brings down the deflector, which, by means of the pin $l$, depresses the trap-spring, allowing it to be caught by the trigger $c$, and at the same time, by means of the projections $i$ and $m$, oscillates the cut-off $j$, which will then deliver its ball into the cup. The cord $n$, being released, leaves the trap charged and set, allows the deflector to rise, and the cut-off to resume its normal position and receive a fresh ball. The trap may be then sprung at pleasure by pulling the trigger-cord $d$.

It may be proper to mention that the deflector $j$ allows the cut-off to rise as soon as the cord $n$ is released, and that, if the deflector were suppressed entirely and the pin $l$ projected under the trap-spring instead of under the deflector, the cut-off would be held down as long as the trap remained set. Such a construction would answer all purposes; but I consider the deflector a refinement of some value, as it allows the cut-off to rise and receive a new ball as soon as the trap is charged and set.

I claim as my invention—

1. The reservoir $o$ $o$, pivoted cut-off $f$, deflector $j$, and the essential elements of a ball-trap, all combined substantially as described.

2. The reservoir $o$ $o$, pivoted cut-off $f$, combined with the essential elements of a ball-trap, substantially as described.

J. LEE SCHRODER.

Witnesses:
  W. N. GRAY,
  JAS. W. SEE.